United States Patent Office 3,020,851
Patented Feb. 13, 1962

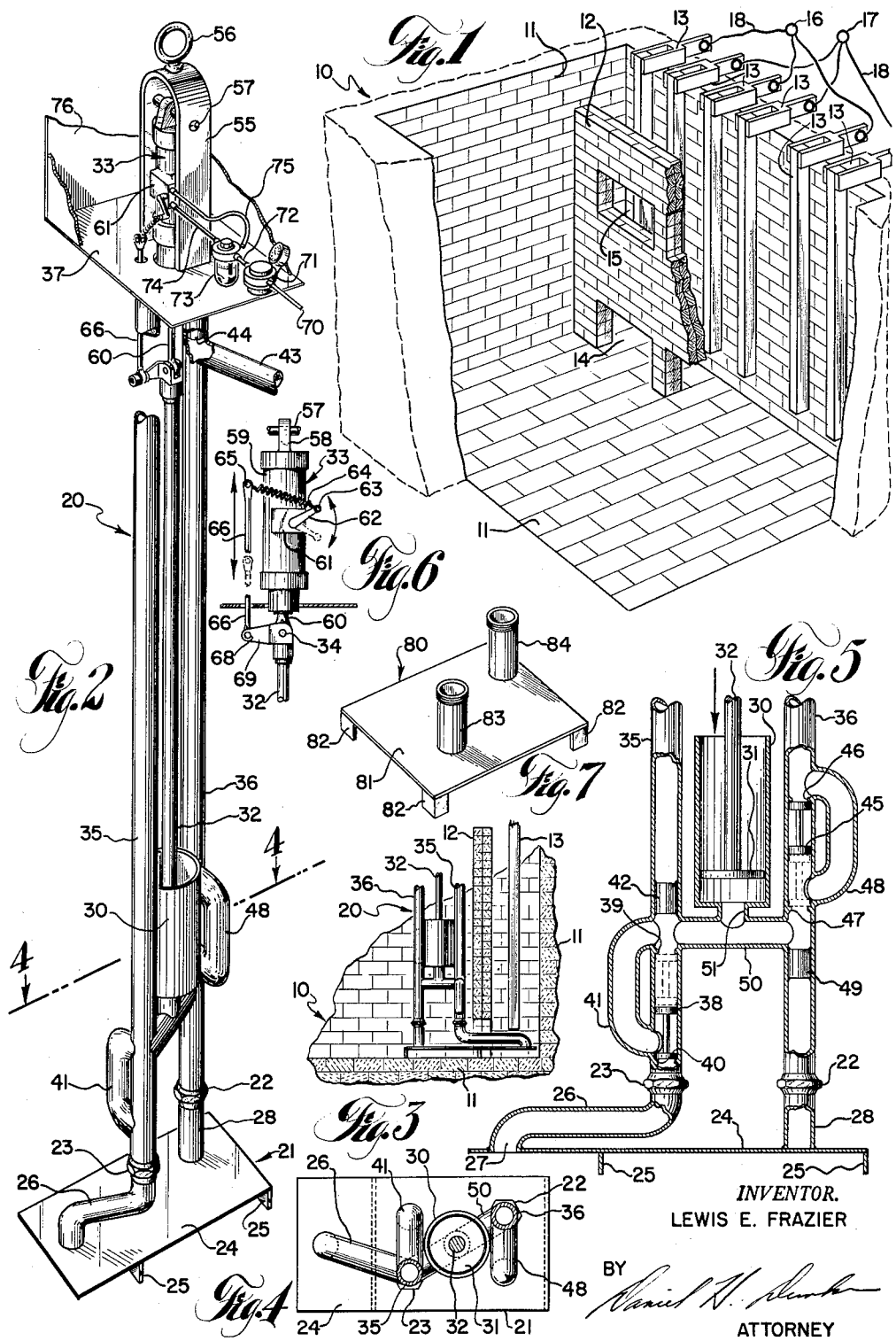
Feb. 13, 1962 — L. E. FRAZIER — 3,020,851
SALT BATH PUMP
Filed Dec. 21, 1959
INVENTOR.
LEWIS E. FRAZIER
ATTORNEY

3,020,851
SALT BATH PUMP
Lewis E. Frazier, Lancaster, Ohio, assignor to
North American Aviation, Inc.
Filed Dec. 21, 1959, Ser. No. 860,999
2 Claims. (Cl. 103—153)

This invention relates to a salt bath pump and particularly concerns an improved pump for removing sludge accumulations from within a molten salt bath contained in a heat treat furnace.

Heretofore, undesirable sludge accumulations have been removed from salt bath heat treat furnaces either through practice of a ladling technique or through an operation wherein solidified sludge is chipped from within a shutdown furnace. Neither technique has proved entirely satisfactory. Known pumps have proven ineffective for sludge removal purposes.

Accordingly, it is an object of this invention to provide a salt bath pump which may be used to effectively pump molten sludge accumulations from bottom regions of an operating heat treat furnace.

Another object of my invention is to provide a salt bath pump with an improved valving arrangement which is effective in the removal of high-temperature molten sludge from heat treat furnaces.

Another object of this invention is to provide a salt bath pump with a foot means that obtain operating advantages in connection with the separation and removal of sludge accumulations from within heat treat furnaces containing a molten salt mass.

A still further object of this invention is to provide an improved salt bath pump which may be operated to remove sludge materials from bottom regions of a heat treat furnace without unduly riling or disturbing the molten salt mass associated therewith.

Another object of my invention is to provide a pump for heat treat furnaces with an improved pneumatic actuator arrangement.

It is another object of this invention to provide a salt bath pump which may be easily manufactured, which is economical to build, and which is comparatively simple to maintain and service.

Other objects and advantages of this invention will become apparent during consideration of the drawings and detailed description.

In the drawings:

FIG. 1 illustrates a furnace which may be utilized to melt salt materials for heat treat purposes;

FIG. 2 illustrates a preferred embodiment of the salt bath pump of this invention;

FIG. 3 is a sectional view showing a portion of the pump of FIG. 2 combined with the furnace of FIG. 1;

FIG. 4 is a sectional view taken at line 4—4 of FIG. 2;

FIG. 5 is a partially sectioned elevation of the lower portion of the pump illustrated in FIG. 2;

FIG. 6 illustrates details of the pneumatic actuator portion of the pump of FIG. 2; and FIG. 7 illustrates an alternate foot means which may be combined with the upper portion of the pump of FIG. 2.

A typical furnace 10 for heat treating metal parts in a molten salt bath is illustrated in FIG. 1. The salt bath pump of my invention has particular utility with respect to furnaces which generally correspond to furnace 10. As illustrated in FIG. 1, the walls and floor of furnace 10 are lined with suitable refractory brick 11. A refractory baffle 12 extends from wall to wall just forward of electrodes 13 and includes openings 14 and 15 that are provided for promoting circulation of molten salt from within the furnace. Electrodes 13 are electrically connected to anode and cathode bus bars 16 and 17 by the various conductor means designated 18. Details are not provided with respect to workpiece handling apparatus cooperating with the furnace. Further, it should be noted that the salt bath pump of this invention is equally effective with respect to salt bath furnace installations which are gas fired rather than electrically heated.

Debris, decomposed salt, scale, and other contaminants act to form a sludge material which tends to accumulate at the furnace bottom and which contributes significantly to furnace operating inefficiency. Further, the presence of such sludge may be correlated with the production of heat treated parts which are unsatisfactory from a metallurgical standpoint. The heretofore-mentioned sludge removal techniques have generally proved unsuitable. Ladling methods typically provide only a stop-gap measure and are known to be totally unsatisfactory from a long range standpoint. In addition, ladling techniques are time-consuming and involve considerable labor costs. The use of a shut-down technique for solidifying and removing sludge materials is undesirable from the standpoint that production efforts involving use of the heat treat furnace are hampered. Known pumps developed for removing heat treat furnace sludge accumulations have proven almost totally ineffective. However, the salt bath pump 20 disclosed by FIG. 2 and subsequent may be utilized to overcome such prior art disadvantages.

Referring to FIG. 2, pump 20 includes a foot portion 21 and an upper portion secured to foot means 21 by the connectors designated 22 and 23. Foot means 21 includes separation plate 24 and the feet 25 connected thereto, inlet fitting 26 attached to plate 24 in communication with opening 27 and attached to connector 23, and support tube 28 attached to plate 24 and to connector 22. The interior of tube 28 does not communicate with the underside of separation plate 24. In the FIGS. 2 through 5 embodiment, inlet fitting 26 is oriented generally parallel to plate means 24.

The upper portion of pump 20 includes pump cylinder 30, pump piston 31 contained in cylinder 30, and pump rod 32 connected at one end to piston 31 and connected at the other end to the double-acting pneumatic actuator unit referenced generally by the numeral 33. Rod 32 is connected to actuator unit 33 by pin means 34. The relative location between foot means 21, pump elements 30 through 32, and actuator unit 33 is established essentially through upright tube members 35 and 36. One end of tube member 35 is attached (welded) to shield platform 37 and the other end thereof is secured to connector 23. In FIG. 2 a portion of tube member 35 has been removed in order that portions of the valve mechanism for actuator unit 33 might be more clearly shown. The lower portion of tube member 35 contains inlet gravity valve member 38 which reciprocates intermediate stops (valve seats) 39 and 40 during operation of the pump. A by-pass tube section 41 communicates at one end with the interior of tube member 35 in the region above stop 39 and at the other end with tube member 35 in the region intermediate stops 39 and 40. Plug member 42 is fixedly contained in tube 35 just above the tube intersection region located upwardly of stop 39.

Upright tube member 36 is connected at one end to platform 37 and at the other end to connector 22. The interior upper portion of tube member 36 communicates with the interior of discharge tube 43 and is provided with a plug member 44 located above the intersection region. The lower portion of tube member 36 contains discharge gravity valve member 45 which reciprocates intermediate stops (valve seats) 46 and 47 during operation of the pump. A by-pass tube section 48 communicates at one end with the interior of tube member 36 in the region above stop 46 and at the other end with the interior of tube member 36 in the region intermediate stops 46 and 47. Plug member 49 is contained interiorly of tube member 36 under the tube intersection located below stop 47. Tube element 50 communicates at each end with tube members 35 and 36 as shown. The lower interior portion of pump cylinder 30 communicates with the interior of tube element 50 through the tube section designated 51.

The upper portion of pump 20 includes the yoke 55 which is securely attached to shield platform 37 and, therefore, to tube members 35 and 36. A suspension ring 56 is connected to yoke 55 for use in hoisting and moving pump means 20. A pin member 57 engages each leg of yoke 55 and restrains the tang 58 of the body portion 59 to actuator unit 33. The rod portion 60 of actuator unit 33 is connected to pump rod 32 by the previously-mentioned pin means 34. Actuator unit 33, which is a conventional double-acting pneumatic cylinder-piston combination, includes bi-directional valve member 61. Interior passageways (not shown) are employed to connect valve member 61 in communicating relation to each interior end of actuator cylinder 59. Valve member 61 has a pivoted valve arm 62, and is connected to rod portion 60 through pin connector 63, tension spring 64, pin connection 65, connecting rod 66, fastener 68, and bracket 69. Bracket 69 is rigidly carried by rod portion 60 and it is preferred that connecting rod 66 be restricted by fastener 68, or by other means, to the extent that it cannot be moved angularly with respect to bracket 69. The upper end portion of connecting rod 66 attains an over-center relation with respect to the pivot point for valve arm 62 when rod portion 60 is fully extended or fully retracted with respect to cylinder 59. The extreme positions of valve arm 62 are shown in FIG. 6 using both solid line and dotted line notations.

Referring again to FIG. 2, air supply line 70 is connected to pressure regulator 71 and a short section of air line 72 connects lubricator device 73 to regulator 71. Another air line section 74 is provided to conduct pressurized air from lubricator device 73 to valve member 61. A short discharge air line section 75 is also connected to valve member 61 and is arranged so that exhaust air from actuator unit 33 impinges upon lubricator device 73. A shield 76 is attached to platform 37 around the periphery thereof to essentially protect the uppermost portions of pump 20 from radiant heat and from convection air currents.

An alternate form of pump foot means is illustrated in FIG. 7. As disclosed therein, foot means portion 80 includes separation plate 81 and the feet 82 connected thereto, inlet fitting 83 and support tube 84. Inlet fitting 83 registers with an inlet opening located in separation plate 81 at a central region. Foot portion 80 differs from foot portion 21 essentially with respect to location of the inlet opening within the periphery of the separation plate means. In the FIG. 2 embodiment the inlet opening is positioned so that the lower extreme of fitting 26 is substantially offset from the axis of tube member 35. Such an arrangement is particularly effective in connection with the removal of sludge accumulations from electrode regions of electrical resistance-type heat treat furnaces.

I prefer that pump means 20 be generally fabricated of corrosion-resistant steel especially as to pump components located below the region of platform 37. Component parts which are rigidly joined to each other are interconnected by use of welding techniques. However, removable-type connectors 22 and 23 are preferred for pump units having interchangeable foot portions. The clearance between pump piston 31 and cylinder 30 is generally of the magnitude of .001" per inch of diameter. However, I prefer that the clearance between gravity valve members 38 and 45 and adjacent tube member interior wall surfaces be approximately ⅛" on the entire diameter.

In operation, pump means 20 is lowered into a molten salt charge contained in a heat treat furnace until the unit is supported upon foot means portion 21. The pump is then connected to a suitable pressurized air supply as through air supply line 70. Air at from 60 p.s.i.g. to 80 p.s.i.g, for instance, is delivered from regulator 71 through line 72, lubricator device 73, and line section 74 to bi-directional valve member 61. Referring to FIG. 6, such pressurized air is ported through valve member 61 and into the upper interior end of cylinder 59. This causes rod portion 60 to be extended relative to body 59 and to move pump rod 32 in a downward direction. Exhaust air from the lower interior portion of cylinder 59 is ported through valve member 61 and discharge line 75 to thereby cause exhaust air to impinge on lubricator device 73. Pump rod 32 downward action causes pump piston 31 to move in the direction of the arrow of FIG. 5. This in turn causes gravity valve member 38 to be more firmly seated against stop member 40 and causes gravity valve member 45 to be raised to the solid line position of FIG. 5. Thus, a portion of any molten material contained in by-pass section 41, tube section 50, element 51, or pump cylinder 30 is forced into by-pass tube section 48 and into the upper interior of tube member 36.

When the lower stroke extreme of piston 31 is attained, valve member 45 drops by gravity into contacting relation with stop 47. Also, as the piston stroke lower extreme position is approached, actuator rod 60 moves valve arm 62 to the dotted line position of FIG. 6 and causes pressurized air to be directed to the lower interior portion of cylinder 59. Movement of rod 32 and piston 31 is thereby effectively reversed.

During upward movement of actuator rod 60, piston 31 reduces the pressure interior of cylinder 30 and thereby causes discharge valve member 45 to be more firmly seated upon stop 47. Simultaneously, the reduced pressure acts to raise gravity inlet valve member 38 to establish flow of molten sludge material through inlet opening 27, inlet fitting 26, and into by-pass tube section 41. Intake flow continues until the upper limit of the stroke of actuator rod 60 is reached. Thereupon, valve member 38 drops by gravity to contact valve seat 40. Terminal upward movement of actuator rod 60 is also effective to reverse the position of arm 62 of the bi-directional actuator valve to thereby initiate movement of the actuator rod and connected pump components in an opposite direction. During the following downstroke, sludge is moved from within cylinder 30, into by-pass section 48, and through discharge 43.

The features of my invention have also been employed in salt bath pump units arranged for manual operation. In such modified units the heretofore-described valving technique is employed together with a separation plate-foot member support combination. In each embodiment of my invention it is preferred that the upper portion of pump cylinder 30 be open in order that piston 31 might be completely immersed in molten material during periods of pump operation. Further, I prefer that piston 31 and the lower portion of cylinder 30 be located as near to separation plate means 24 as is reasonably possible.

It is to be understood that the form of the invention herewith shown and described is to be taken as a preferred embodiment of the same, but that various changes in the shape, size, and arrangement of parts may be resorted to without departing from the spirit of the invention or the scope of the subjoined claims.

I claim:
1. An improved pump for removing accumulated molten sludge from within a heat treat furnace, and comprising: separation plate means having an interiorly-located inlet opening, foot members secured to and projected downwardly from said plate means, tube members secured to and projected upwardly from said plate means, gravity valve members contained in said tube members, opposed stop means contained in said tube members in limiting relation to said valve members, piston-cylinder means connected to said tube members in fluid-conducting relation intermediate said gravity valve members, actuator means connected to said piston-cylinder means, and discharge means, said actuator means being positioned vertically above said discharge means, said piston-cylinder means being positioned a substantial distance vertically below the upper extreme of said discharge means, and one of said tube members being connected to said inlet opening and the other of said tube members being connected to said discharge means.

2. An improved salt bath pump unit for removing sludge accumulations from within a heat treat furnace, and comprising: piston-cylinder pump means, discharge means connected to said piston-cylinder pump means in fluid-conducting relation, inlet means connected to said piston-cylinder pump means in fluid-conducting relation and having an inlet valve member, and a foot portion connected to said inlet means, said foot portion having an inlet opening located a substantial transverse distance from said inlet valve member, a separate plate means extended radially about said inlet opening, a foot member projected downwardly of one side of said separation plate means, and connecting means secured to said separation plate means and connecting said foot portion inlet opening to said pump unit inlet means in fluid-conducting relation.

References Cited in the file of this patent

UNITED STATES PATENTS

| | | |
|---|---|---|
| 504,366 | Romans | Sept. 5, 1893 |
| 610,279 | Ricketts | Sept. 6, 1898 |
| 1,388,087 | Bach | Aug. 16, 1921 |